(12) United States Patent
Rana et al.

(10) Patent No.: US 7,829,119 B2
(45) Date of Patent: Nov. 9, 2010

(54) METHOD TO FABRICATE MICROCAPSULES FROM POLYMERS AND CHARGED NANOPARTICLES

(75) Inventors: Rohit K. Rana, Houston, TX (US); Vinit S. Murthy, Houston, TX (US); Michael S. Wong, Houston, TX (US)

(73) Assignee: William Marsh Rice University, Houston, TX (US)

( * ) Notice: Subject to any disclaimer, the term of this patent is extended or adjusted under 35 U.S.C. 154(b) by 1289 days.

(21) Appl. No.: 10/969,391

(22) Filed: Oct. 20, 2004

(65) Prior Publication Data

US 2005/0158390 A1  Jul. 21, 2005

Related U.S. Application Data

(60) Provisional application No. 60/512,738, filed on Oct. 20, 2003.

(51) Int. Cl.
*A61K 9/14* (2006.01)
*A61J 3/07* (2006.01)
(52) U.S. Cl. .......................................... 424/489; 264/4
(58) Field of Classification Search ................. 424/490, 424/489; 264/4; 106/409; 428/403, 404, 428/407
See application file for complete search history.

(56) References Cited

U.S. PATENT DOCUMENTS 7,056,554 B2 * 6/2006 Voigt et al. ............... 427/213.3

2003/0069131 A1  4/2003 Ying et al.
2003/0082237 A1  5/2003 Cha et al.

FOREIGN PATENT DOCUMENTS

WO  WO 9947253 A1 *  9/1999
WO  WO 0209865 A1 *  2/2002

OTHER PUBLICATIONS

Sean A. Davis et al.; "Bacterial templating of ordered macrostructures in silica and silica-surfactant mesophases"; Nature, Jan. 30, 1997; pp. 420-423; vol. 385.
Peng Jiang et al.; "A Lost-Wax Approach to Monodisperse Colloids and Their Crystals"; Science, Jan. 19, 2001; pp. 453-457; vol. 291.
F. Caruso et al.; "Nanoengineering of Inorganic and Hybrid Hollow Spheres by Colloidal Templating"; Science, Nov. 6, 1998; pp. 1111-1114; vol. 282.

(Continued)

*Primary Examiner*—Robert A Wax
*Assistant Examiner*—Aradhana Sasan
(74) *Attorney, Agent, or Firm*—Conley Rose, P.C.; Rodney B. Carroll

(57) ABSTRACT

A method for making hollow nanoparticles, comprises a) providing an amount of a polyelectrolyte having a charge, b) providing an amount of a counterion having a valence of at least 2, c) combining the polyelectrolyte and the counterion in a solution such that the polyelectrolyte self-assembles to form spherical aggregates, and d) adding nanoparticles to the solution such that nanoparticles arrange themselves around the spherical aggregates. The polyelectrolyte may have a positive or negative charge. The charge ratio R of total charge of the counterions to the total charge of the polyelectrolyte is greater than 1.0.

28 Claims, 2 Drawing Sheets

OTHER PUBLICATIONS

Michael S. Wong et al.; "Assembly of Nanoparticles Into Hollow Spheres Using Block Copolypeptides"; Amer. Chem. Soc., Apr. 26, 2002; Nano Letters, pp. 582-587; vol. 2, No. 6.

Jennifer N. Cha et al.; "Microcavity Lasing From Block Peptide Hierarchically Assembled Quantum Dot Spherical Resonators"; Amer. Chem. Soc., May 5, 2003; Nano Letters, pp. 907-911; vol. 3, No. 7.

Thibaud Coradin et al.; "Interactions of Amino-Containing Peptides with Sodium Silicate and Collodial Siica: A Biomimetic Approach of Silification"; Langmuir 2002; pp. 2331-2336; vol. 18.

Vinit S. Murthy et al.; "Charge-Driven Flocculation of Poly (L-lysine)-Gold Nanoparticle Assemblies Leading to Hollow Microspheres"; J. Am. Chem. Soc. 2004; pp. 5292-5299; vol. 126.

J. A. Zasadzinski et al.; "Complex vesicle-based structures"; Colloid & Interface Science, 2001; pp. 85-90; vol. 6.

Ziyi Zhong et al.; "Preparation of Mesoscale Hollow Spheres of $TiO_2$ and $SnO_2$ by Templating Against Crystalline Arrays of Polystyrene Beads"; Adv. Mater, 2000; pp. 206-209; vol. 12, No. 3.

Sean A. Davis et al.; "Template-Directed Assembly Using Nanoparticle Building Blocks: A Nanotectonic Approach to Organized Materials"; Chem. Mater., 2000; pp. 3218-3226; vol. 13.

Yuri Lvov et al.; "Urease Encapsulation in Nanoorganized Microshells"; Amer. Chem. Soc.; 2001; Nano Letters, pp. 125-128; vol. 1, No. 3.

Peter T. Tanev et al.; "Titanium-containing mesoporous molecular sieves for catalytic oxidation of aromatic compounds"; Nature, Mar. 24, 1994; vol. 368.

Jennifer N. Chia et al.; "Spontaneous Formation of Nanoparticle Vesicles From Homopolymer Polyelectrolytes"; J. Am. Chem. Soc. 2003; pp. 8285-8289; vol. 125.

Siddharth V. Patwardhan et al.; "Silification and Biosilificatin"; J. Inorg. Organomet. Poly., Mar. 2003; pp. 49-53; vol. 13, No. 1.

Siddharth V. Patwardhan et al.; "Silification and Biosilificatin"; Polymer Bulletin 2002; pp. 367-371; vol. 48.

Andrew K. Boal et al.; "Self-assembly of nanoparticles into structured spherical and network aggregates"; Nature, Apr. 13, 2000; pp. 746-748, vol. 404.

Jutta Hotz et al.; "Polymer Particles by Templating of Vesicles"; Adv. Mater. 1998; pp. 1387-1390; vol. 10, No. 16.

Lara A. Estroff et al.; "At the Interface of Organic and Inorganic Chemistry: Bioinspired Synthesis of Composite Materials"; Chem. Mater. 2001; pp. 3227-3235; vol. 13.

Angang Dong et al.; "Hollow Zeolite Capsules: A Novel Approach for Fabrication and Guest Encapsulation"; Chem. Mater, Aug. 2002; pp. 3217-3219; vol. 14, No. 8.

Jong Hwa Jung et al.; "Novel Vesicular Aggregates of Crown-Appended Cholesterol Derivatives Which Act as Gelators of Organic Solvents and as Templates for Silica Transcription"; J. Am. Chem. Soc. 2000; pp. 8648-8653; vol. 122.

Hiroshi Matsui et al.; "Fabrication of Nanocrystal Tube Using Peptide Tubule as Template and Its Application as Signal-Enhancing Cuvette"; J. Phys. Chem. 2001; pp. 1683-1686; vol. 105.

Stella M. Marinakos et al.; "Gold Particles as Templates for the Synthesis of Hollow Polymer Caplules. Control of Capsule Dimensions and Guest Encapsulation"; J. Am. Chem. Soc. 1999; pp. 8518-8522; vol. 121.

Dominicus H. W. Hubert et al.; "Vesicle-Directed Growth of Silica"; Adv. Mater., Sep. 1, 2000; pp. 1286-1290; vol. 12, No. 17.

Helim Aranda-Espinoza et al.; "Electrostatic Repulsion of Positively Charged Vesicles and Negatively Charged Objects"; Science, Jul. 16, 1999; pp. 394-397; vol. 285.

David L. Wilcox, Sr. et al.; "Hollow and Solid Spheres and Microspheres: Science Technology Associated With Their Fabrication and Application"; Materials Research Society's Symposium Proceedings, Nov. 3-Dec. 1, 1994; Boston, Ma.; pp. 1-296; vol. 372.

Calvert, P. Biomimetic Inorganic-Organic Composites. In *Biomimetic Materials Chemistry*; Mann, S., Ed.; VCH: New York, Chapter 11, pp. 315-336 (1996).

McKenna, Brandon, et al., "Self-Assembling Microspheres from Charged Functional Polyelectrolytes and Small-Molecule Counterions," Mat. Res. Soc. Symp. Proc., vol. 823 (2004), Materials Research Society, pp. W4.12.1-W4.12.6.

Pillai, Zeena S., et al., "What Factors Control the Size and Shape of Silver Nanoparticles in the Citrate Ion Reduction Method?" J. Phys. Chem. B, vol. 108, No. 3 (2004), American Chemical Society, pp. 945-951.

Rogach, Andrey L., et al., ""Raisin Bun"-Type Composite Spheres of Silica and Semiconductor Nanocrystals," Chem. Mater., vol. 12, No. 9 (2000), American Chemical Society, pp. 2676-2685.

Foreign communication from a counterpart application—International Search Report and Written Opinion, PCT/US04/34664, Oct. 17, 2005, 7 pgs.

Foreign communication from a related counterpart application—International Preliminary Report on Patentability, PCT/US2004/034664, Apr. 24, 2006, 5 pgs.

Foreign communication from a related counterpart application—Supplementary European Search Report, EP 04 81 7802, Apr. 12, 2007, 3 pgs.

\* cited by examiner

METHOD TO FABRICATE MICROCAPSULES FROM POLYMERS AND CHARGED NANOPARTICLES

CROSS-REFERENCE TO RELATED APPLICATIONS

This application claims benefit of U.S. application Ser. No. 60/512,738 filed Oct. 20, 2003, and entitled "Multivalent Counterion-Mediated Self-Assembly of Polyelectrolytes," which is incorporated herein by reference in its entirety.

STATEMENT REGARDING FEDERALLY SPONSORED RESEARCH OR DEVELOPMENT

Not applicable.

Field of the Invention

The present invention provides a novel method for the fabrication of well-structured materials utilizing nanoparticles as building blocks and polyelectrolytes as the structure-directing agents. More specifically, a charge-driven assembly of inorganic nanoparticles by oppositely charged polyelectrolytes in presence of multivalent counterions leads to the formation of microshells or microcapsules having spherical or other shapes.

Background of the Invention

The synthesis of hierarchically ordered inorganic frameworks is of potential interest in various fields including catalysis, separation techniques, and materials chemistry. In particular, recent attention has been focused on the use of organic superstructures to assemble nanoparticles with controlled morphologies. This methodology termed as "nano-techtonics" involves novel approaches relying upon bioinspired synthesis and assembly of nanobuilding blocks to allow the design of complex architectures with controlled size, shape, orientation and polymorphic structures. Various organic templates derived from surfactants, polymers and biomolecules, have been used to template the growth of inorganic materials. The specificity, stability and degree of organization of the organic template were found to be crucial in dictating the level of control over the morphology of the resulting materials. A wide variety of particle structures and shapes such as spherical, porous, fibrous and tubular shapes have emerged out of this supramolecular assembly.

Fabrication of hollow-spheres has been of immense interest owing to the encapsulation properties of these microshells that can find applications in diverse areas such as confined-reaction vessels, catalysis, adsorption, biomolecular separation, drug-delivery processes, foods, cosmetics, and insulation. The feasibility of forming hollow spheres using the assembly of nanoparticles has recently been demonstrated. Caruso et al. have shown that layer-by-layer assembly of charged inorganic particles and polyelectrolytes onto sub-micron polystyrene particles can yield hollow spheres after subsequent calcinations to remove the sacrificial core particles [Caruso et al., 1998]. Dong et al. have produced hollow zeolite capsules via the vapor-phase transport treatment (VPT) of nanozeolite (seeds) coated mesoporous silica spheres [Dong et al., 2002]. Under the effect of the amine vapor during VPT treatment, the seeds on the surface grew by completely consuming the silica in the mesoporous silica cores, thus generating hollow spherical shells built of grown zeolite crystals.

There are examples of using vesicles composed of surfactant molecules that assemble into bilayers as templates for the hollow sphere formation. These spherical bilayer shells have also been studied for drug delivery but suffer from a lack of robustness [Zasadzinski et al., 2001]. Templating by vesicles and vesicular aggregates using metal alkoxide precursors [Hubert et al., 2000; Jung et al., 2000] and polymers [Hotz and Meier, 1998] has been shown possible with specific surfactants. Interestingly, submicron spheres were found to form rafts on vesicles instead of forming a complete shell, which has negative implications for templating vesicles with the much smaller nanoparticles [Aranda-Espinoza et al., 1999].

There have also been traditional methods other than self assembly where a large particle (sub-micron/micron diameters ~100's of nm) is generally coated with a ceramic (or polymer) precursor, and then removed to leave behind a ceramic (or polymer) hollow sphere [Wilcox et al., 1995]. Interesting variations include using Au nanoparticles to template polymer shells [Marinakos et al., 1999], and using polymer microspheres to template polymer shells [Lvov et al., 2001] and titania shells [Zhong et al., 2000]. In a different approach, Colvin and co-workers created a polymer cast of an opaline structure of silica microspheres, removed the silica, and deposited onto the interior polymer walls a ceramic precursor to construct titania hollow spheres [Jiang et al., 2001].

While previous preparation routes to hollow spheres appear flexible, they tend to be labor-intensive processes, requiring multiple steps to be performed in a sequential manner. Encapsulation of a desired compound within the hollow spheres further requires additional steps, and any preparation schemes must avoid degradation of the desired compound. Hence it is desired to provide a method for making microcapsules that is simple and easy to perform.

SUMMARY OF THE INVENTION

The present invention provides a simple and convenient method of based on a self-assembly process that leads to the formation of microshells (sometimes hereinafter referred to as microcapsules or nanoparticle-assembled capsules (NACs)) having spherical and non-spherical shapes. In preferred embodiments, the present methods for making microcapsules comprise providing a polyelectrolyte having a positive or negative charge, providing an oppositely charged counterion having a valence of at least 2 and more preferably at least 3, combining the polyelectrolyte and the counterion in a solution such that polyelectrolyte self-assembles to form spherical aggregates, and adding nanoparticles to the solution such that nanoparticles arrange themselves around the spherical aggregates. The method may be carried out at ambient temperature and may further include the step of removing the polyelectrolyte so as to produce hollow spheres.

In some embodiments, the final step produces sub-micron/micron-sized organic-inorganic spheres in which the shell consists of nanoparticles and polyelectrolyte molecules that hold the nanoparticles together. The method may further include functionalizing the polyelectrolyte with at least one moiety selected from the group consisting of: organic molecules, organic fluorophores, and biomolecules and the functionalization may occur before the formation of the encapsulating nanoparticle shell. Alternatively or in addition, the nanoparticles may be functionalized.

In certain embodiments, the polyelectrolyte comprises a polyamine. In other embodiments, the polyelectrolyte is any polymer that has a positive charge in solution.

The counterion is preferably be added as a salt, which may comprise a compound selected from group consisting of but not limited to carboxylates, sulphates and carbonates such as sodium sulphate, trisodium citrates, tri sodium salts of EDTA, tetra sodium salts of EDTA, and combinations thereof. Alternatively, the counterion may be a crown-ether consisting of charged moieties such as carboxylates, phosphates, sulfates or carbonates.

In certain embodiments, the nanoparticles comprise silica nanoparticles. In certain other embodiments, the nanoparticles are colloidal species and can comprise metals, metal non-oxides, metal oxides having positively charged surface.

In certain other embodiments, the polyelectrolyte is negatively charged, the counterion is positively charged and the nanoparticles have negative surface charge.

The invention also includes products made by providing a positively charged polymer (polyelectrolyte) in solution with a counterion and contacting the solution with silica nanoparticles and compositions comprising aggregates of positively charged polyelectrolyte, counterions, and silica nanoparticles.

In still other embodiments, the counterion is selected from the group consisting of polymers, dendrimers, molecular ions, and metal ions. In specific embodiments, the polymer comprises DNA and/or the nanoparticles comprise ceramic particles.

Notably, the synthesis performed according to the present fabrication methods can be performed at neutral pH and ambient conditions. A variety of inorganic and organic nanoparticles such as metals, metal-oxides, metal-non-oxides, non-metal oxides, and polymer beads can be used, depending upon their ability to have electrostatic interactions with the charged polyelectrolytes. The microshells thus formed often have spherical morphologies with a shell wall composed of the inorganic/organic nanoparticles and the polyelectrolyte. It is expected that the hollow core of these materials can be utilized to encapsulate useful and interesting materials for special applications such as drug delivery, packaging, catalysis, and sensors. Importantly, the mild synthesis conditions allow the encapsulation of sensitive organic compounds without degrading them. In addition, the synthesis process can be modified to be both economically and environmentally favorable.

The present methods provide a direct and efficient synthesis route in which charged polymers interact with multivalent counterions leading to the self-assembly of these polymers, which in turn templates the assembling of inorganic/organic nanoparticles to form hollow spheres. The present methods allow the preparation of hollow or non-hollow microspheres without the use of expensive Au nanoparticles or quantum dots (required by related methods to hollow microspheres [M. S. Wong, J. N. Cha, K.-S. Choi, T. J. Deming, and G. D. Stucky, "Assembly of Nanoparticles into Hollow Spheres Using Block Copolypeptides," Nano Lett. 2, 583-587 (2002); J. N. Cha, H. Birkedal, M. H. Bartl, M. S. Wong, and G. D. Stucky, "Spontaneous Formation of Nanoparticle Vesicles from Homopolymer Polyelectrolytes," J. Am. Chem. Soc. 125, 8285-8289 (2003); J. N. Cha, M. H. Bartl, M. S. Wong, A. Popitsch, T. J. Deming, and G. D. Stucky, "Microcavity Lasing from Block Peptide Hierarchically Assembled Quantum Dot Spherical Resonators," Nano Lett. 3, 907-911 (2003); V. S. Murthy, J. N. Cha, G. D. Stucky, and M. S. Wong, "Charge-driven Flocculation of Poly-L-lysine-Gold Nanoparticle Assemblies Leading to Microshell Formation," J. Am. Chem. Soc. 126, 5292-5299 (2004); United States Patent Application 20030082237). According to the present methods, the aggregation of polyamines or other polyelectrolytes is effectively controlled by adding various types of multidentate counterions at appropriate concentrations and pH's (Table 2). These then template and spontaneously yield hollow spheres via the self-assembly of nanoparticles under a wide pH range and at ambient reaction conditions.

Microshells prepared according to the present invention provides have potential applications in diverse areas such as drug delivery, chemical storage, contaminated waste removal, gene therapy, catalysis, cosmetics, magnetic contrast agents (for use in magnetic resonance imaging), and magneto-opto-electronics. Microshells made from porous nanoparticles as the building blocks can find use as low-dielectric materials, insulation, catalysts, separation membranes, and photonic band-gap materials. It should be emphasized that for many of the above applications the present synthesis procedure provides flexibility to meet the required reaction conditions such as pH of the medium, temperature, etc. depending upon specific applications.

Thus, the present invention comprises a combination of features and advantages which enable it to overcome various problems of prior methods. The various characteristics described above, as sell as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1:
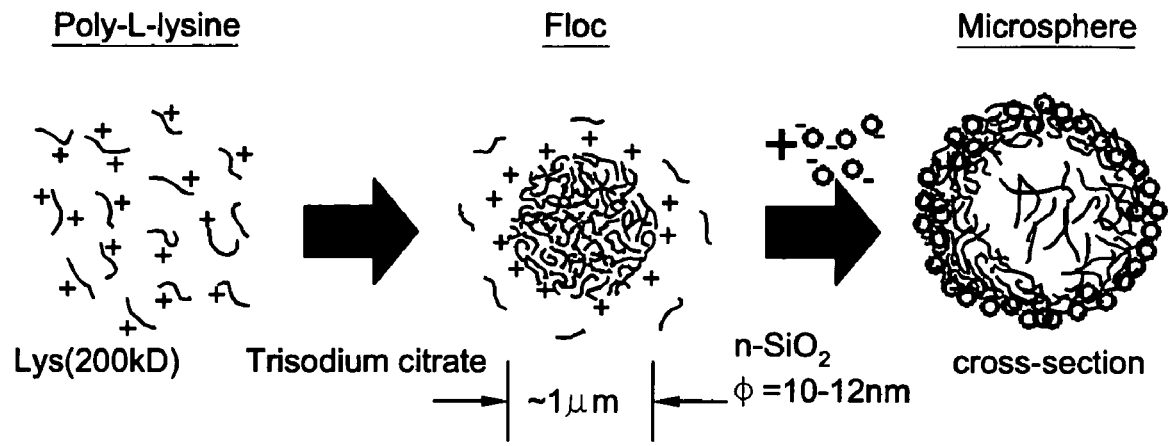
FIG. 1 is a schematic illustration of a proposed mechanism of formation.

The present invention provides a single-step method for synthesis of ordered, hollow or filled spheres or non-spherical shapes within a wide range of reaction parameters. The present methods are extremely simple to carry out, allow great flexibility in structure design and materials composition, and can be made environmentally and economically benign. The ease of encapsulating a wide variety of compounds in the resulting aggregate particles makes them viable for a broad spectrum of applications. The present methods entail adding counterions to a solution of charged polyelectrolyte so as to cause the polyelectrolyte to self-assemble, along with the counterions, into aggregates. The selected counterion(s) is/are added to a solution of the polyelectrolyte in a concentration sufficient to produce a desired ratio of total counterion charge to total polyelectrolyte charge, which causes formation of spherical aggregates. A sol (suspension) of a predetermined type of nanoparticle is then added to the same solution, whereupon these nanoparticles arrange themselves around the spherical aggregates. The nanoparticles infiltrate and/or encapsulate the aggregated polyelectrolyte.

The positively charged polyelectrolyte can comprise a compound selected from the group consisting of polypeptides, polyamides, and polyamines with different chain lengths with straight or branched structures (e.g., polylysine, polyallylamine, polyethyleneimine). In these embodiments the counterion is preferably negatively charged and comprises a compound selected from the group consisting of carboxylates, phosphates, sulfates, carbonates, aminocarboxylates, peptides, polypeptides, copolypeptides and polymers having negative charge (e.g. polyaspartic acid and poly-glutamic acid). Alternatively, with a negatively charged polyelectrolyte, the counterion is preferably positively charged and comprises cationic counterions such as polyamines. In these embodiments the negatively charged polyelectrolyte can comprise a compound selected from the group consisting of polypeptides, polyacids and polystyrenesulphonate or derivatives thereof. Suitable copolypeptides may be derived from the 20 natural amino acids (lysine, arginine, histidine, aspartic acid, glutamic acid, glycine, alanine, valine, leucine, isoleucine, methionine, proline, phenylalanine, tryptophan, serine, threonine, asparagine, glutamine, tyrosine, and cysteine). Combinations of polypeptides and polymers may also be used.

The polyelectrolye and the counterions are preferably selected and provided such that the overall charge ratio R of total charge attributable to the dissolved salt to total charge attributable to the polymer is greater than 1.0, more preferably greater than 2, still more preferably greater than 3, and optionally about 10. When the polyelectrolyte is positively charged, R can be expressed as $R=[anion] \times |z^-|/[polymer] \times |z^+|$, where [anion] and [polymer] represent total concentrations, $z^-$ is negative charge per anion, and $z^+$ is positive charge per polymer chain. In embodiments in which the charges are reversed, the polyelectrolyte is negatively charged and the counterions are cations and $R=[cation] \times |z^+|/[polymer] \times |z^-|$.

The polyelectrolyte is preferably dissolved in water, or in any other solvent that is capable of dissolving both the polyelectrolyte and the counterion precursor. The synthesis can be carried out over a broad range of temperatures, limited primarily by the solvent. Thus, in some embodiments the preferred temperature range is between 0° C. and 100° C. and more preferably 20° C. to 85° C. As discussed in more detail below, the pH of the solution may have an effect on the rate of aggregation and on the structure of the resulting microcapsules.

The nanoparticles can be silica or can comprise colloidal metals, such as gold, platinum, palladium, copper, silver, rhodium, rhenium, nickel, and iridium having surface positive/negative charge, alloys of metals, such as platinum/iridium having surface positive/negative charge, metal nonoxides, such as Group II-VI, III-V, and IV quantum dots having surface positive/negative charge, or metal oxides, such as titanium oxide, zirconium oxide, aluminum oxide, iron oxide, tungsten oxide, cerium oxide, antimony oxide and silicon oxide having surface positive/negative charge. In other embodiments, the nanoparticles may alternatively comprise molecular clusters, such as Keggin ions and heteropolymetallates, or may be organic and composed of crosslinked polymer, such as polystyrene and polypyrrole.

In still other embodiments, silica nanoparticles can be replaced with same-charged linear polymers, such as polyacrylate and polystyrene sulfonate, to form microcapsule structures via electrostatic interactions.

The nanoparticles can also be provided in the form of uncharged polymers, such as dextran, to form microcapsule structures. Hydrogen-bonding and/or hydrophobic interactions rather than electrostatic interactions are what drives the adsorption of uncharged polymer into the polylysine-salt aggregates in these embodiments.

The thus-formed microcapsules assembled from nanoparticles can also be used as building blocks for further assembling them to make hierarchical hollow sphere structures. The hierarchical structure may comprise microcapsules made from same or different polymers, counterions and nanoparticles.

A compound of interest can be encapsulated by adding it to the polymer-counterion aggregate followed by the addition of nanoparticles, such that this compound is contained in the core of the formed microcapsule, within the shell of the microcapsule, or bound to the inner or outer surfaces of the microcapsule. Other ways to encapsulate include adding the compound to the polymer solution before counterion addition and adding the compound after nanoparticle addition.

The compounds that are encapsulated in the microcapsules can be selected from the group consisting of enzymes for biochemical reactions and organic dyes for use as sensors or indicators. Alternatively, magenetic nanoparticles such as those found in a ferro-fluid for magnetic data storage applications can be encapsulated.

The preparation of microcapsules can include post-treatment of the sphere surface with organic molecules, additional nanoparticles, and an inorganic coating.

The present synthesis methods can be carried out in a flow-type reactor, such as microfluidic device or in an aerosol reactor, or in any other type of reactor that allows the components to come into mixing contact with each other. The preparation of the microcapsules satisfies many of the requirements for a chemical process to be "green" and environmentally friendly, enabling the scale-up of the preparation method. It can be carried out at room temperature, at atmospheric pressure, in water, and at mild pH values by mixing the 3 components sequentially together. Controlling how the components are mixed at the nanoscale is an additional approach to tune the microcapsule size, size distribution, and shape.

In certain embodiments, polyamines are used as the structure-directing agent in the presence of trisodium citrate or tri/tetra sodium salt of EDTA. The polyamines are preferably dissolved in water at a predetermined concentration. A solution of a selected salt is added to the polyamine solution in a concentration sufficient to produce the desired charge ratio, whereupon the counterions mediate the self-assembly of polyamines to form aggregates. The aggregates begin as spheres, but may become non-spherical if the aggregation is allowed to proceed at length. Once the desired spherical or non-spherical aggregates have formed, nanoparticles such as silica nanoparticles are added and arrange themselves in and/or around the aggregate.

The formation of microcapsules according to the present methods has been monitored using optical and confocal microscopy using FITC-tagged PLL. One proposed mechanism for the hollow sphere formation is schematically shown in FIG. 1. As illustrated there, the polymer is believed to form globular aggregates upon addition of EDTA, which then yield microcapsule structures (with sharply defined inner and outer perimeters) upon the addition of $SiO_2$ nanoparticles. The polymer aggregates are necessary for microcapsule formation, as confirmed by a negative control experiment in which combining $SiO_2$ nanoparticles with a PLL solution resulted in randomly structured aggregates. The microcapsules have the PLL located in the core interior and within the shell wall, where the positively charged polymer chains are interspersed with the negatively charged $SiO_2$ nanoparticles.

Various counterions tested for the synthesis are tabulated in Table 1. In these embodiments, the resulting product comprises sub-micron/micron-sized organic-inorganic spheres, in which the shell is relatively thick and consists of nanoparticles and the polyamine molecules that hold the nanoparticles together. The organic polyamine mostly remains inside the sphere sticking to the shell-wall, and may be removed to produce a completely or substantially hollow inorganic sphere. To encapsulate other organics the polyamines may be functionalized with organic molecules, organic fluorophores, biomolecules or the like before formation of the encapsulating nanoparticle shell.

Alternatively, the nanoparticles themselves may be functionalized to have active species on the outer surface of the spheres. The nanoparticles can be functionalized with cationic/anionic polymers that can be assembled by adding suitable counterions. Alternatively, the nanoparticles can be functionalized with molecules that provide a hydrophobic or hydrophilic surface.

The nanoparticles preferably have diameters of 1-100 nm and are preferably spherical, although nanoparticles with shapes other than spheres, such as rods, triangles, and hexagons can be used, as can combinations of nanoparticles.

The thick microcapsule shell walls observed in microcapsules made according to the present methods are inconsistent with Langmuir-type adsorption of $SiO_2$ nanoparticles around the polymer aggregates, which should yield a shell wall one nanoparticle thick (~12 nm). We propose that the nanoparticles penetrate the surface exterior of the polymer aggregate and that the penetration depth determines the shell thickness, with the implication that smaller particles diffuse deeper into the polymer aggregate than larger particles. Indeed, replacing the $SiO_2$ particles with oligomeric silicate clusters (~1 nm) contained in silicic acid preparations led to spheres with thicker shells and even solid silica cores.

A minimum number of binding sites in the anion is typically required, as found for PLL and PAH (polyallylamine hydrochloride) (Table 2). Curiously, divalent carboxylate anions (e.g., succinate and malonate) and sulfate anions did not cause PLL to aggregate, but did so with PAH. The aggregation process is apparently sensitive to polymer and counterion molecular structure. Polyamines are well-suited to use in the present techniques. Other polyamines like poly(L-arginine) and poly(ethyleneimine) formed aggregates with citrate anions, as long as the pH of the synthesis medium was below the polyamine pKa's (~9.5-11). Aggregation occurred over a wide range of polymer molecular weights (10-250 kDa), with the longer chains tending towards larger polymer aggregates.

The importance of solution pH to polymer aggregation can be observed by comparing different citrate salts. At the same R ratio, the trisodium and disodium salts led to PLL aggregates (Table 2). These suspension pH's were above 5, and acid-base equilibrium calculations indicate the citrate was mostly in the form of $Hcit^{2-}$ and $cit^{3-}$ species. On the other hand, monosodium citrate and citric acid solutions did not yield polymer aggregates, as calculations indicated that citrate anions were in the form of $H_3cit$ and $H_2cit^-$ species at pH values below 5. Thus, solution pH controls the effective charge (and therefore binding site number) of the multivalent anion, and polymer aggregation proceeds within a pH window defined by the pKa's of the anionic salts and polyamines. The assembled microcapsules can be disassembled/reassembled by changing the pH of the aqueous suspension.

In some instances, the microcapsule will be filled with cross-linked polyelectrolyte and solvent, while in other instances, the microcapsule will be missing the polyelectrolyte from the core. Microcapsules can thus be filled with polymer and water ("filled" microcapsules) or filled only with water ("hollow" microcapsules). Additionally, the microcapsules can be removed from the water or solution and dried. In the dry state they are hollow and contain air or another gas.

Figure 2A:
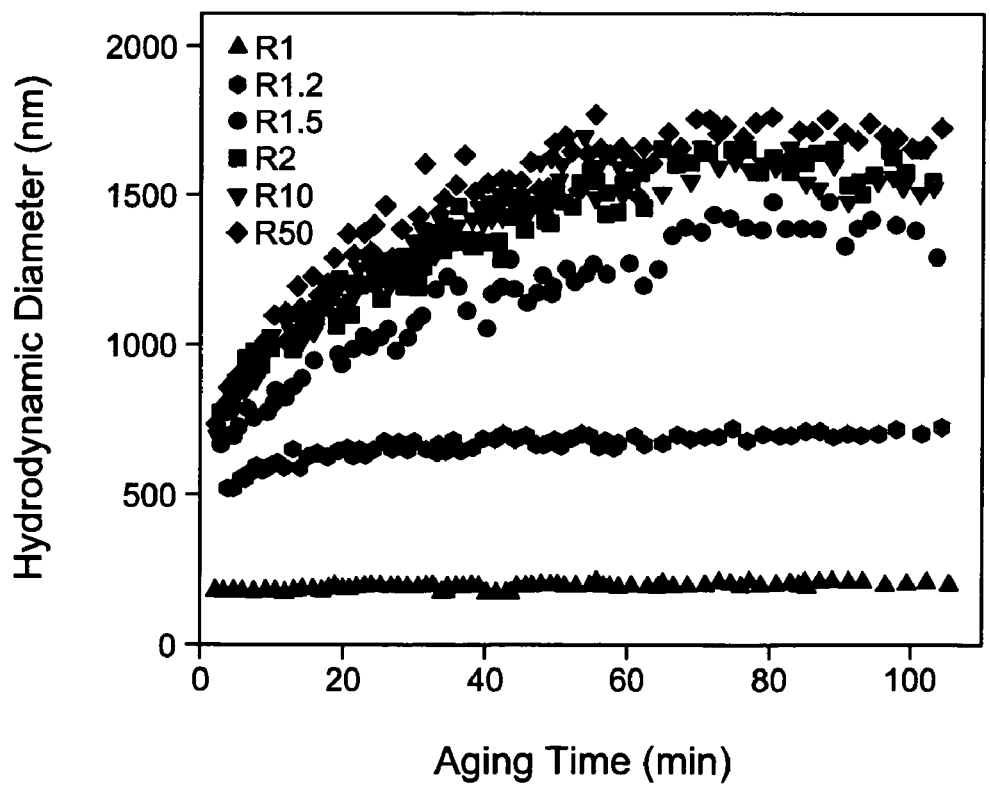
FIG. 2 is four plots showing the effect of aging time and charge ratio on aggregates formed by the present methods.
Figure 2B:
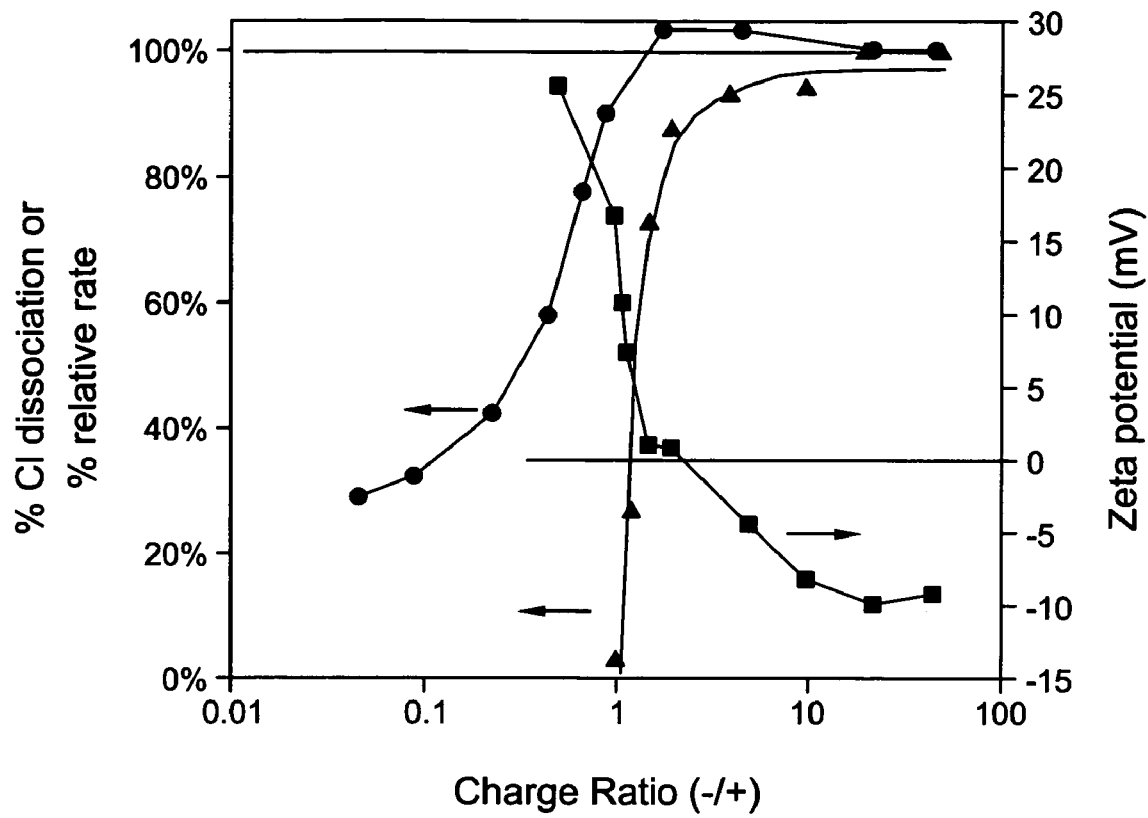
Figure 2C:
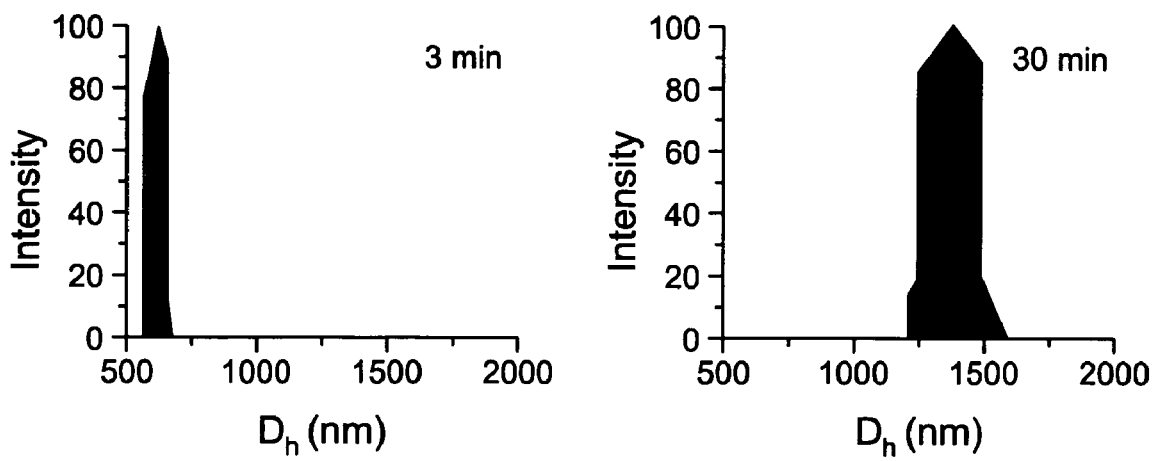

The polymer aggregates grow in size with aging time through coalescence. To gain an understanding of the polymer aggregation dynamics, we focused on citrate-bridged PAH aggregates (FIG. 2a). Aggregation formation was immediate after citrate addition, with the hydrodynamic diameter ($D_h$) of the PAH solution measured at ~110 nm (before citrate addition) and ~700 nm (2 min after citrate addition). For comparison, addition of a NaCl solution at the same charge ratio (R=10) and at higher concentrations did not induce PAH aggregation; instead, PAH contracted ($D_h$~30 nm) due to Coulombic screening of the positive charged ammonium units. Crosslinking between the citrate and the PAH could be tracked by measuring the increase in free chloride concentration caused by the displacement of Cl– bound to the polymer backbone. Chloride potentiometric measurements of the PAH-only solution indicated that 26% of the total Cl– were dissociated, and that one citrate molecule displaced ~2.2 Cl– ions, based on the initial slope of the Cl dissociation curve. Although the polymer aggregates are metastable, they are apparently rigid enough to allow for nanoparticle deposition and shell formation; the addition of $SiO_2$ nanoparticles to the aggregate suspension aged at different times results in microcapsules of tunable diameters (FIGS. 2(c) and 2(d)).

It has been found that the charge ratio R governs the formation and growth rate of the salt-bridged polymer aggregates. Polymer aggregation occurs at R>1, which is coincident with the near complete removal of Cl— ions from the PAH by the citrate anions. The zeta-potentials of the polymer aggregates decrease in magnitude and eventually assume negative values with increasing R values with the observed charge reversal resulting from citrate anions binding to the aggregate exterior. The aggregates remain insufficiently charged (–10 mV<zeta-potential <+10 mV, between R=1.2 and R=50) to prevent contact with each other and with $SiO_2$ nanoparticles, allowing for fast aggregate growth and shell formation, respectively.

We refer to this type of microcapsule formation as the tandem self-assembly of charged nanoparticles and polymer molecules. Nanoparticles of other metal oxide compositions, such as tin oxide and zinc oxide, can be used to generate capsular structures as long the particle surface is negatively charged (Table 1). This condition is ensured if the pH of the suspending fluid is higher than the point-of-zero charge of the metal oxide. Interestingly, negatively-charged linear polyelectrolytes like poly(acrylic acid) (PAA) and poly(styrene sulfonate) (PSS) can also yield microcapsular structures, in which they presumably take the place of silica nanoparticles in the shell formation step.(Table 2).

TABLE 1

Negatively-charged colloidal species self-assemble into microcapsule structures.

| Nanoparticle (or polymer) composition | Particle size (or molecular weight) | | pzc (or pKa) | pH of microcapsule suspension | Zeta potential (mV) |
|---|---|---|---|---|---|
| $SiO_2$ | 10-20 | nm | 2 | 6.0 | –13 |
| ZnO | 50-90 | nm | 9 | 8.9 | –41 |
| $SnO_2$ | 10-15 | nm | 4-7 | 9.0 | –20 |
| CdSe | 3-5 | nm | — | 7.6 | –30 |
| Carboxylated Polystyrene | 20 | nm | — | 7.2 | –26 |
| PAA | 30 | kDa | 4.8 | 8.5 | — |
| PSS | 70 | kDa | 1 | 8.4 | — |

The colloidal species (NPs and anionic polyelectrolytes) were added to a suspension of either (FITC tagged)-PLL/citrate or PAH/citrate suspension after aging for 30 min (R = 10). Microcapsules of 1-6 μm diameter were typically formed, as evaluated through a combination of optical and fluorescence microscopies.
Electrophoretic mobilities of PAA and PSS confirmed the negative charges of the polymers.

Table 2 below lists various sodium salt forms that were used for microcapsule synthesis from PLL (222 kDa) or PAH (70 kDa) and $SiO_2$ nanoparticles. The charge ratio R was kept at 10 for all the experiments. "√" and "×" indicate whether hollow sphere was formed or not respectively under the reaction conditions described as in Example I. The +ve to –ve charge ratio was kept between 1:4 and 1:10 in all the experiments.

TABLE 2

| Anions | Structure | Salt form | suspension | Polymer aggregate formation? | Microcapsule formation? |
|---|---|---|---|---|---|
| Chloride | $Cl^-$ | NaCl | 5.5 | x | x |
| Acetate | $H_3C-COO^-$ | Na acetate | 6.6 | x | x |
| Sulphate | $SO_4^{2-}$ | $Na_2SO_4$ | 6.8 | x<br>✓ (for PAH) | x<br>✓ (for PAH) |
| Malic Acid | $^-OOC-CH(OH)-CH_2-COO^-$ | $Na_2$ hydroxy succinate | 6.6 | x<br>✓ (for PAH) | x<br>✓ (for PAH) |
| Succinate | $^-OOC-CH_2-CH_2-COO^-$ | $Na_2$ succinate | 7.2 | x<br>✓ (for PAH) | x<br>✓ (for PAH) |
| Tri-carballylate | $^-OOC-CH_2-CH(COO^-)-CH_2-COO^-$ | $Na_3$ tri-carballylate | 6.1 | ✓ | ✓ |
| Citrate | $^-OOC-CH_2-C(OH)(COO^-)-CH_2-COO^-$ | $Na_3$citrate<br>$Na_2$Hcitrate<br>$NaH_2$citrate<br>Citric acid | 7.4<br>5.3<br>3.8<br>2.8 | ✓<br>✓<br>x<br>x | ✓<br>✓<br>x<br>x |
| Isocitrate | $^-OOC-CH(CH_2-COO^-)-CH(OH)-COO^-$ | $Na_3$ isocitrate | 7.5 | ✓ | ✓ |
| EDTA | $(^-OOC-CH_2)_2N-CH_2-CH_2-N(CH_2-COO^-)_2$ | $Na_4$EDTA<br>$Na_3$HEDTA<br>$Na_2H_2$EDTA | 10.1<br>9.0<br>4.8 | ✓<br>✓<br>x | ✓<br>✓<br>x |
| Asp-Asp-Asp-Asp- | (tetra-aspartate structure) | $Na_5(ASP)_4$ | 8.8 | ✓ | ✓ |

| | Structure | | Valence | Hollow Sphere |
|---|---|---|---|---|
| $Na_3Ca$ salt of Diehtylene triamine pentaacetate | (DTPA structure) | | 5 | x |
| Meta Tungstate | $W_{12}O_{39}^{6-}$ | | 6 | x |
| Sodium salt of Poly-acrylate | $*-[CH_2-CH(COO^-)]_n-*$ | | MWt. 2000 | x |

Polymer aggregates can also be supported on surfaces to template the formation of capsular hybrid structures. Citrate-bridged PAH aggregates adsorbed on a mica surface, which appear as flattened spheres due to spreading, lead to dome-like shells after contacting with $SiO_2$ nanoparticles.

The rapid generation of microcapsules in an aqueous medium is amenable to the facile encapsulation of water-soluble compounds, for example, by adding a solution of the desired cargo to a PLL/citrate suspension prior to adding the silica sol. To test the feasibility of microcapsules as reaction vessels, acid phosphatase enzyme was encapsulated at a loading of 0.15 mg/(mg microshell) and the resulting spheres were suspended in a solution containing fluorescein diphosphate, a non-fluorescent molecule. Fluorescence emerged and grew in intensity inside the microcapsule and within the shell wall over a course of 40 min, due to the formation of fluorescein from enzymatic cleavage of the phosphates. It was not possible to discern if the enzyme molecules were located inside the microcapsule, within the shell wall, or both, but confocal analysis indicated clearly the generated fluorescein was accumulating inside the shell wall and in the interior before diffusing out after 15 min. Vigorous mixing or sonication did not noticeably degrade the microcapsule structure or the contained enzyme. The microcapsules allow the confined enzymes to function in a protected environment, and allow the reactant and product molecules to transport across the permeable shell walls.

The preferred embodiments described above can be varied widely. Some variations are discussed above and further shown in Table 3 below. Additional illustration of the invention is given by the Examples that follow.

TABLE 3

(A + B) → Polymer aggregates
Polymer aggregates + C → Microcapsules

| A | B | C |
|---|---|---|
| I. Positively charged component + anion | | |
| Poly(allyamine) | Sulphate | $SiO_2$ nanoparticle (NP) |
| Poly(L-lysine) | Succinate | ZnO NP |
| Poly(ethyleneimine) | Carbonate | $SnO_2$ NP |
| Poly(arginine) | Phosphate | CdSe NP |
| Generalization | Isocitrate | Au NP |
| | | |
| Polyamines | Tri-carballylate | Carboxylated Polystyrene NP |
| Polypeptides | Citrate | PAA NP |
| Polycopeptides | EDTA | PSS NP |
| Positively Charged polymers | DTPA | Dextran |
| Derivatives thereof | $(Asp)_4$ | Generalization |
| | | |
| | Tungstate | Metal NPs |
| | Molybdate | Metal oxide NPs |
| | Heteropolyacids | Chalcogenide NPs |
| | Generalization | Molecular Clusters |
| | | |
| | Molecular Clusters | Functionalized NPs |
| | Polyacids | Negatively Charged NPs |
| | Peptides | Negatively Charged polymers |
| | Polypeptides | Nonionic polymers |
| | Polycopeptides | Biomolecules |
| | Dendrimers | Virus particles |
| | Derivatives thereof | Buckyballs |
| | | Carbon nanotubes |
| | | Derivatives thereof |
| II. Positively charged component + anion | | |
| Poly(acrylate) | $Ca^{2+}$ | $Al_2O_3$ NP |
| Poly(aspartate) | $Al^{3+}$ | MgO NP |
| Poly(styrenesulphonate) | $B^{3+}$ | Poly(allyamine) |
| Generalization | Generalization | Generalization |
| | | |
| Polyacids | Transition metal ions | Metal NPs |
| Polypeptides | Alkaline-earth metal ions | Metal oxide NPs |
| Polycopeptides | Lanthanide metal ions | Chalcogenide NPs |
| Negatively Charged polymers | Actinide metal ions | Molecular Clusters |
| Derivatives thereof | Amines | Functionalized NPs |
| | Peptides | Positively Charged NPs |
| | Molecular Clusters | Positively Charged polymers |
| | Polyamines | Nonionic polymer |
| | Polypeptides | Biomolecules |
| | Polycopeptides | Virus particles |
| | Dendrimers | Buckyballs |
| | Derivatives thereof | Carbon nanotubes |
| | | Derivatives thereof |

EXAMPLE I

Microcapsule Formation Using poly(L-lysine) (222 kDa), Trisodium Citrate and $SiO_2$ Nanoparticles An aqueous solution of poly-L-lysine (MW=222 kDa, HBr salt form) was prepared with a concentration of approximately 2.0 mg/ml. 21 µl of this polypeptide solution was taken in a 1.5 ml microcentrifuge tube and to it 125 µl of 2.14 mM aqueous solution of trisodium citrate was added and then vortex-mixed for 10 sec The positive/negative charge ratio R in the solution was 4. Dynamic light scattering (DLS) was used to monitor the size of the spherical aggregates formed. The DLS analysis showed that the aggregates are of ~1 microns average hydrodynamic diameter. To form the silica hollow spheres, 125 µl of a sol containing $SiO_2$ nanoparticles (Snowtex O, Nissan Chemicals; 20.4 wt % solids, pH 3.4, 13±3 nm diameter as measured through DLS) was added immediately to Solution A and vortex mixed for 20 sec (Solution B). The solution A was occasionally aged for various times to see the changes in aggregate size and its effect on the final size of the silica hollow sphere by subsequently adding the silica sol to the aged Solution A. After centrifugation of the solution B for 30 sec a clear precipitate was seen. When viewed in optical microscope images, this precipitate was seen to be composed of spherical objects having a hollow center. The sizes of these microshells were ~2 µm. In the absence of citrate salt, when $SiO_2$ nanoparticle were added directly to the poly-L-lysine solution, large masses of irregular shapes were formed. The synthesis was carried out at room temperature and the pH of Solutions A and B was 7.19 and 4.8 respectively. The spherical morphology of the particles could clearly be seen in SEM images. Some other shapes were also observed, such as spheres with a single dimple and spheres with an opening.

Optical microscopy was performed on Zeiss Axiovert Size distribution analyses were carried out with Brookhaven Zeta-PALS dynamic light scattering (DLS) equipment with BI-9000AT digital autocorrelator at 656 nm wavelength. All studies were done at a 90° scattering angle and temperature controlled at 25° C.; standard 50 µl cuvettes were used for size distribution analysis. Scanning electron microscopy (SEM) was carried out in JEOL 6500 field emission microscope equipped with in-lens thermal field emission electron gun. Secondary electron image (SEI) was taken at 15 kV electron beam with a working distance of 10.0 mm. The microsphere suspension was aged for two days, washed with Isotone solution, and suspended in isopropanol before being loaded and air-dried onto carbon tape for imaging. Transmission electron microscopy was performed on JEOL 2010 FasTEM system at 100 kV.

EXAMPLE II

Microcapsule Formation Using FITC Conjugated Poly(L-lysine) (68 kDa), Trisodium Citrate and $SiO_2$ Nanoparticles In order to get more insight into the mechanism, poly-L-lysine attached with dye molecules was used. Poly-L-lysine conjugated with FITC (MW=68 kDa, HBr salt form) was dissolved in water to make a solution of 2 mg/mL concentration. To a 1.5 ml microcentrifuge tube containing 21 µl of the above solution, 125 µl of 2.14 mM trisodium citrate solution was added. The resulting solution A was vortex mixed for 10 sec and then 125 µl of $SiO_2$ sol was added to it and vortex mixed for 20 sec. Fluorescence optical microscope images showed that the polymer forms aggregates of spherical shape after addition of citrate, as shown by the fluorescing dye molecules attached to the polymer. Microshells after silica sol addition are spherical in shape, having poly-L-lysine attached to the interior part of the shell-wall, which indicates a templating mechanism by which the silica nanoparticles are arranged surrounding the polymer aggregates. The formation of an empty core is believed to be an effect of charge interactions of polymers with silica nanoparticles that attracts the polymer from core towards its surface.

EXAMPLE III

Microcapsule Formation Using Poly(L-lysine) (30 kDa), Trisodium Citrate and $SiO_2$ Nanoparticles Silica hollow spheres formed from a poly-L-lysine (30 kDa)/trisodium citrate/silica nanoparticles system using similar concentrations as describe in example I had smaller sizes than those obtained with poly-L-lysine (222 kDa).

EXAMPLE IV

Microcapsule Formation Using Poly(L-lysine) (222 kDa), Different Concentrations of Trisodium Citrate and $SiO_2$ Nanoparticles The effect of relative ratios of poly-L-lysine (222 kDa) and trisodium citrate on the silica hollow sphere formation was investigated. Table 2 shows the various concentrations of citrate and the corresponding charge ratios that were studied. All the samples were tested by DLS measurements for size distribution of the aggregates before addition of silica. The aggregate size initially increased with increase in citrate concentration till 0.01M citrate solution and then decreased. Further, silica addition resulted in hollow sphere formation for a citrate concentration in 0.001-0.1 M range. Outside this range it formed small and big aggregates with irregular shapes.

EXAMPLE V

Aggregation of Poly(L-lysine) (Conjugated with FITC, 68 kDa) with Trisodium Citrate at Different pH In order to study the effect of pH on the hollow sphere formation, to a solution of 21 µl poly-L-lysine-FITC (68 kD) and 125 µl trisodium citrate (2.14 mM), various amounts of NaOH or HCl were added. The ionic strength of NaOH and HCl solutions was kept same as that of the poly-L-lysine and citrate mixture (0.011 M) so that the addition of base or acid would not change the final ionic strength. After maintaining the desired pH, 125 µl silica sol was added. Hollow spheres were formed from a solution (poly-L-lysine-FITC+Citrate+Acid/base) having pH in the 6-8 range. Beyond this range only aggregates of irregular shapes were observed.

EXAMPLE VI

Effect of Aggregate-aging on the Size of Microcapsule Derived from Poly(L-lysine) (222 kDa), Trisodium Citrate System and $SiO_2$ Nanoparticles After addition of trisodium citrate as in Example I, the solution A was aged for 1 min, 30 min, and 2 hr and then the silica sol was added. The microscopy analyses showed that hollow spheres formed from these solutions had larger diameters when the sample was aged longer.

EXAMPLE VII

Microcapsule Formation Using Poly(allylamine) (70 kDa), Trisodium Citrate and $SiO_2$ Nanoparticles Poly(allylamine) (70 kDa) was used along with a trisodium citrate solution and silica nanoparticles to prepare hollow spheres. The concentrations of various constituents were kept same as that in example I. Optical and SEM images clearly indicate the formation of hollow spheres, open spheres, and dimpled spheres.

EXAMPLE VIII

Microcapsule Formation Using Poly-L-Lysine (222 kDa) and Tri- and Tetra-sodium Salt of Ethylenediamine Tertacetate and $SiO_2$ Nanoparticles Tri- and tetra-sodium salt of EDTA (ethylenediamine tetraacetate) were used as counterions for assembling poly-L-lysine (222 kDa). The salt concentration was 5.36 mM and 4.02 mM for tri and tetra sodium salt of EDTA, respectively. All other concentrations and reaction conditions were kept same as in Example I. The optical images illustrate that tri- and tetra-sodium EDTA salts are effective in forming silica hollow spheres.

EXAMPLE IX

Microcapsule Formation Using Poly-L-lysine (222 kDa), Tricarballylic Acid and $SiO_2$ Nanoparticles Sodium salt of tricarballylic acid (TCA) was prepared by adding 80 µl of 0.161 mM NaOH solution to 100 µl of TCA (0.0536 mM) solution. 125 µl of the resulted solution was then added to 21 µl of PLL (222 kDa) and vortex mixed for 10 sec. To this, 125 µl silica sol was added and vortex mixed for 20 sec. Microspheres were formed.

EXAMPLE X

Microcapsule Formation Using Poly-L-lysine (222 kDa), Tetra-aspartate and $SiO_2$ Nanoparticles Sodium salt of tetra-aspartic acid (Asp-Asp-Asp-Asp) was prepared by adding 5 µl of NaOH (0.1607 mM) to 130 µl of 0.01839 mM Asp-Asp-Asp-Asp solution. 125 µl of this solution was then added to 21 µl of PLL (222 kDa) and vortex mixed for 10 sec. To this, 125 µl of silica sol was added and vortex mixed for 20 sec to obtain the hollow microspheres.

EXAMPLE XI

Microcapsule Formation Using FITC Conjugated Poly-L-Lysine (68 kDa), Tetra-sodium Salt of Ethylenediamine Tertacetate and $SiO_2$ A room-temperature synthesis of microcapsules is illustrated by using poly(L-lysine) (PLL) conjugated to fluorescein isothiocyanate (FITC) dye. In a typical preparation, 21 µl of a FITC-tagged PLL solution (2 mg/ml, 68 kDa, HBr salt) is gently mixed for 10 sec with 125 µl of a tetrasodium ethylenediamine tetraacetate solution ($Na_4$ EDTA, 4.02 mM) or with a trisodium citrate solution ($Na_3$Cit, 5.36 mM). The overall charge ratio R of total negative charge of the added salt to total positive charge of the polymer (R=[anion]×|z−|/[polymer]×|z+|, where z− is negative charge per anion and z+ is positive charge per chain) is 10. This slightly cloudy polymer/salt solution is aged for 30 min and then vortex mixed with 125 µl of a silica sol (particle diameter of 13±3 nm, 20 wt % $SiO_2$, pH~3.4) for 20 sec. The immediate increase in turbidity is due to microcapsule formation. The as synthesized colloidal assemblies are spherical and have a core/shell morphology with diameters primarily in the 1-4 µm size range, according to optical microscopy images and Coulter counter size measurements. The microcapsule yield is estimated from fluorospectroscopy measurements to be 85-90%, on a polymer weight basis. According to TGA results, the microcapsules have a volatiles content (which includes the salt and polymer) in the 12-15 wt % range, indicating that these organic/inorganic NAC materials are composed mostly of silica.

This Example is similar to Examples 1 and 8, except that the polymer is shorter and connected to FITC. It is also similar to Example 5, except that it was carried out without changing pH.

EXAMPLE XII

Synthesis of $SiO_2$ Hollow "Sprouted" Spheres

125 µl of 1.61 mM tetra-sodium salt of EDTA solution was added to 21 µl of 2 mg/ml poly-L-lysine conjugated with FITC (68.6 kDa) solution and vortex mixed for 10 sec. 125 µl of silica sol was then added and vortex mixed for 20 sec to obtain the microshells. Optical imaging revealed that many of the microshells were pear-shaped or included protuberances or other departures from the normal spherical shape. This indicates that non-spherical microshells of different shapes can also be synthesized. It is believed that it may also be possible to make wires using the present techniques by mixing the suspension under high shear conditions.

The present technique is extremely amenable to further variations, including at least the following.

Cationic polymer+Negatively charged nanoparticles

Polypeptides and polyamines having varying chain lengths and with straight or branched structures can be used in the present techniques. Anionic counterions with different functional groups, such as carboxylates, phosphates and sulfates (e.g. phosphate and sulfate analogues of Citrate and EDTA) can be used with them, as can counterions such as peptides, polypeptides, copolypeptides and other polymers having negative charge (e.g. aspartic acid and glutamic acid).

Anionic polymer+Positively charged nanoparticles

Alternatively, polypeptides and polyacids having different chain lengths with straight or branched structures can be used. Cationic counterions such as metal ions ($Ca^{2+}$, $Mg^{2+}$, transition metal ions etc.) can be used with them, as can counterions such as peptides, polypeptides, copolypeptides and polymers having positive charge (e.g. lysine and histidine).

The nanoparticles can also comprise biomolecules that assume a globular structure, such as enzymes, proteins, and virus particles.

The present invention provides a technique that is extremely simple and reproducible and produces organic-inorganic hybrid materials. The synthesis may be performed at ambient reaction conditions and can be a fast, one-step synthesis, in which a salt/polymer solution is mixed with a nanoparticle suspension. Likewise, the synthesis can be carried out in a wide pH range and in one pot, and no need for latex particles or other sacrificial core material is required.

The hybrid materials produced according to the invention have desirable encapsulation properties, because target compounds can easily be encapsulated during the formation of the microcapsules. The structure of the microcapsule can be controlled (shell thickness, water-filled or polymer-filled, diameter), which, in turn, leads to control of how much is encapsulated and how the contained compound is released from the microcapsule. The present microcapsules are more robust than microshells produced by sacrificial templates such as latex particles (because the latter has thinner shells). They are also more stable than organic hollow spheres like vesicles. Vesicles can also encapsulate target compounds during their formation but they do not remain intact once they are removed from water and they have even thinner shell walls. Lastly, the process is much more economical than other methods for preparing nanoparticle-based hollow spheres.

In the claims that follow, any sequential recitation of steps is not intended as a requirement that the steps be performed sequentially, or that one step be completed before another step is begun, unless explicitly so stated.

While preferred embodiments of this invention have been shown and described, modifications thereof can be made by one skilled in the art without departing from the scope of this invention. The embodiments described herein are exemplary only and are not limiting. Accordingly, the scope of protection is not limited to the embodiments described herein, but is only limited by the claims that follow, the scope of which shall include all equivalents of the subject matter of the claims.

We claim:

1. A method for making microcapsules, comprising:
   a) providing an amount of a polyelectrolyte having a charge;
   b) providing an amount of a counterion having a valence of at least 2;
   c) combining the polyelectrolyte and the counterion in a solution such that the polyelectrolyte self-assembles to form spherical aggregates wherein the spherical aggregates are counterion-polyelectrolyte aggregates; and
   d) subsequently adding nanoparticles to the solution such that nanoparticles arrange themselves around the counterion-polyelectrolyte aggregates to form the microcapsules, wherein the nanoparticles comprise a single nanoparticle population.

2. The method according to claim 1 wherein the counterion has a valence of at least 3.

3. The method according to claim 1 wherein the charge ratio R of total charge of the counterions to the total charge of the polyelectrolyte is greater than 1.0.

4. The method according to claim 1 wherein steps a)-c) are carried out such that the pH of the synthesis solution is $\leq$pKa of the polyelectrolyte.

5. The method according to claim 1, further comprising removing the polyelectrolyte so as to produce hollow microcapsules.

6. The method of claim 1 wherein the formed microcapsules are organic-inorganic spheres having a shell of nanoparticles surrounding the counterion-polyelectrolyte aggregates.

7. The method according to claim 1 wherein the polyelectrolyte is functionalized with at least one moiety selected from the group consisting of: organic molecules, organic fluorophores, and biomolecules.

8. The method according to claim 1 wherein the nanoparticles are functionalized.

9. The method according to claim 1 wherein the polyelectrolyte comprises a polyamine.

10. The method according to claim 1 wherein the polyelectrolyte has a positive charge in solution.

11. The method according to claim 1 wherein counterion is provided in the form of at least two salts selected from the group consisting of carboxylates, sulphates, carbonates, citrates, sodium salts of aminocarboxylates, and combinations thereof.

12. The method according to claim 1 wherein the nanoparticles comprise metals, metal oxides, metal-nonoxides, organic particles, linear polymer, biomolecules, fullerenols or single/multi-walled carbon nanotubes.

13. The method according to claim 1 wherein the nanoparticles comprise silica nanoparticles.

14. The method according to claim 1 wherein at least one of c) and d) is carried out at ambient temperature.

15. The method according to claim 1 wherein the polyelectrolyte has a negative charge in solution.

16. The method according to claim 1 wherein the charged polyelectrolyte comprises a compound selected from the group consisting of linear polypeptides, linear polyamines, branched polyamines, branched polypeptides, and combinations thereof.

17. The method according to claim 1 wherein the counterion is negatively charged and comprises a compound selected from the group consisting of carboxylates, phosphates, sulfates, peptides, polypeptides, copolypeptides, and negatively charged polyelectrolytes.

18. The method according to claim 1 wherein the counterion is positively charged and comprises at least one cationic counterion selected from the group consisting of peptides, polypeptides, copolypeptides, amines, polyamines, and positively charged polyelectrolytes.

19. The method according to claim 1 wherein the counterion is selected from the group consisting of charged polymers, dendrimers, molecular ions, and metal ions.

20. The method according to claim 1 wherein the size of the microcapsules is in the range of 500-5000 nm.

21. The method according to claim 1 wherein the size of the microcapsules is in the range of 100-500 nm.

22. The method according to claim 1 wherein the size of the microcapsules is in the range of 5000-50000 nm.

23. The method according to claim 1, further including aging the counterion-polyelectrolyte aggregates formed in step c) for up to 10 hr prior to the addition of nanoparticles.

24. The method according to claim 1 wherein the microcapsules are water-filled, polymer-filled, or gas-filled.

25. A method for making hollow microcapsules, comprising:
   a) providing an amount of a polyelectrolyte having a charge;
   b) providing an amount of a counterion having a valence of at least 2, wherein the charge ratio R of total charge of the counterions to the total charge of the polyelectrolyte is greater than 1.0;
   c) combining the polyelectrolyte and the counterion in a solution such that the polyelectrolyte self-assembles to form spherical aggregates wherein the spherical aggregates are counterion-polyelectrolyte aggregates; and
   d) subsequently adding nanoparticles to the solution such that nanoparticles arrange themselves around the counterion-polyelectrolyte aggregates to form the hollow microcapsules, wherein the nanoparticles comprise a single nanoparticle population.

26. The method of claim 11 wherein the counterion comprises sodium sulphate, trisodium citrate, tri sodium salts of EDTA, tetra sodium salts of EDTA, or combinations thereof.

27. The method of claim 17 wherein the negatively charged polyelectrolytes comprises aspartic acid or glutamic acid.

28. The method of claim 18 wherein the positively charged polyelectrolytes comprises lysine or histidine.

* * * * *